Oct. 28, 1941.   E. A. CLAPP   2,260,510
AUTOMATIC ELECTRIC WELDING
Filed July 2, 1940
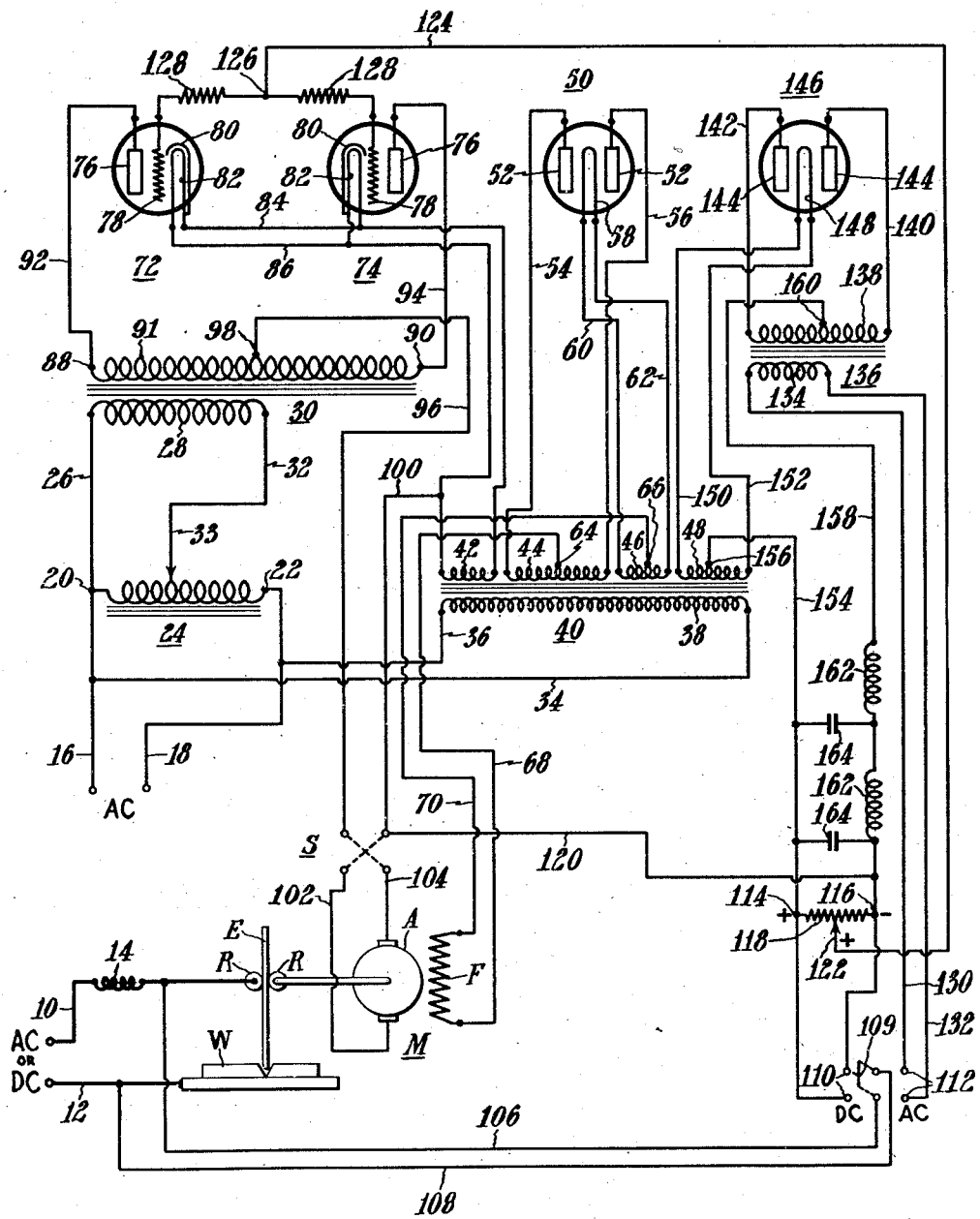
INVENTOR
EDWIN A. CLAPP
BY
ATTORNEY Patented Oct. 28, 1941

2,260,510

UNITED STATES PATENT OFFICE 2,260,510

AUTOMATIC ELECTRIC WELDING

Edwin A. Clapp, Niagara Falls, N. Y., assignor to The Linde Air Products Company, a corporation of Ohio Application July 2, 1940, Serial No. 343,523

12 Claims. (Cl. 219—8)

This invention relates to automatic electric welding, and more particularly to an improved system for automatically controlling the feeding of a welding electrode adapted to be fused and deposited upon the work which may constitute the cooperative electrode.

To produce strong welds of uniform quality, the amount and character of the fusion of the weld metal and the work must be accurately controlled; and it is essential that the work be heated evenly along the line of weld. These may be done by maintaining the position of the fusing end of the welding rod or electrode, with respect to the work, substantially constant along the line of weld as the electrode is fed to the work. As the welding voltage is a function of the distance between the electrode and the work, variations in the welding voltage may be used to control the electrode feeding mechanism progressively to maintain the position of the electrode with respect to the work at a desired effective value as the welding operation progresses.

Such control of the spacing of the electrode from the work by the welding voltage has been attempted to be effected in various ways. In some known welding systems, it has been proposed to vary the excitation of an electrode feeding motor by applying the welding voltage directly to the motor. Due to inertia of the motor, however, such systems are unsatisfactory because they do not respond sufficiently quickly to sudden variations in the welding voltage.

In another known system, the power supply for the electrode feeding mechanism has been controlled by an electric space discharge device by impressing a proportionate part of the welding voltage upon the control grid of the device to thereby permit or interrupt the flow of current to the feeding mechanism dependent upon the spacing of the electrode from the work. The type of space discharge device hitherto used in such form of welding system has been controlled by variations in the value of the relative negative potential of the grid with respect to the cathode of the discharge device. In order to prevent the feeding mechanism from operating in reverse, it has been necessary to provide a complicated balancing circuit for the space discharge device. Such balancing circuit, which is used as a reference value for the control circuit, is usually supplied with current from a power line or from batteries. Inasmuch as there is a plus or minus variation of about 5% in the voltage of the ordinary alternating current power supply line, there is considerable difficulty in calibrating the control circuit against such a varying reference point. Furthermore, such variation in the voltage of the supply line, and hence of the balancing circuit, decreases the accuracy of operation of the entire control system. Due to their short life, the use of batteries for the balancing circuit is an impractical solution to the above difficulties.

Another difficulty inherent in such a system as heretofore used, has been the decreased sensitivity of control. This is due to the fact that the balancing voltage must be substantially of the order of the welding voltage, in order that the control system will function effectively. To overcome this difficulty, it has hitherto been proposed to use a rather elaborate transformer arrangement to step up both the welding and the balancing voltage about ten times to thereby increase the sensitivity of the control. Even with this arrangement, however, if the actual welding voltage prior to being stepped up were dropped from about 40 volts to about 20 volts, the sensitivity of the control circuit would be cut substantially in half.

Still a further difficulty encountered in known automatic electric welding systems has been their inadaptability for interchangeable use of alternating current and direct current for welding. Such systems as hitherto used, have been designed for use either with direct current or with alternating current but not interchangeably with both types of current.

The principal objects of this invention are to provide an automatic electric welding system in which the voltage across the welding zone is maintained at a substantially constant predetermined value; to provide a control system for an electrode feeding mechanism which is directly responsive to variations in voltage at the welding zone to maintain the fusing end of the electrode at a substantially constant distance from the work to be welded; to provide an electric welding system in which the feeding of the electrode to the work is controlled automatically by one or more positive grid-controlled space discharge devices directly responsive to variations in the voltage drop across the welding zone; to provide an automatic electric welding control system which is interchangeably operative on either alternating or direct current; and to provide a simplified automatic electric welding system which is relatively inexpensive to install and maintain.

These and other objects of the invention will in part be obvious and in part become apparent from the following description and the accompanying drawing, in which the single figure diagrammatically illustrates an electric welding system embodying the principles of the invention.

Generally speaking, in accordance with the present invention, power for energizing the electrode feeding mechanism is supplied through one or more grid-controlled space discharge devices of the type which permits a flow of current when the relative positive potential of the control grid with respect to the cathode exceeds a certain value, hereinafter called the critical value. When the relatively positive potential of the control grid is less than this critical value, the power supply to the feeding mechanism is interrupted.

Through a suitable control circuit, a voltage which is directly proportional to the welding voltage is impressed across the grid and cathode of the space discharge device. Means are provided in the control circuit so that if the welding voltage exceeds a predetermined value, the voltage impressed on the grid of the space discharge device will exceed the critical value. Hence, when the distance between the fusible end of the electrode and the work increases, thus increasing the welding voltage drop, the space discharge device supplies current to the feeding mechanism. The feeding mechanism thereby becomes operative to advance the electrode toward the work until the predetermined spacing is again obtained, whereupon, the potential impressed on the grid of the space discharge device becomes less than the critical value and the power supply for the feeding mechanism is accordingly interrupted. The space discharge device or devices may be considered as an electric valve arrangement controlling the flow of current to the feeding mechanism, and thus affording a very sensitive control of the voltage drop across the welding zone and hence of the distance between the fusible end of the electrode and the work.

Additionally, means are provided in the welding system whereby the control system is operative equally with either alternating current or direct current. Thus, in accordance with the invention, there is provided an electric welding system comprising, in combination, a welding circuit including a fusible electrode and the work, the circuit being adapted to utilize either alternating current or direct current for welding; means, including a direct current electric motor, for feeding said electrode toward the work; and means, including a control circuit responsive to a condition of the welding circuit when said welding circuit utilizes alternating current and also when said welding circuit utilizes direct current for controlling said motor. Additionally, selectively operable means are provided to connect the control circuit directly to the welding circuit when the welding circuit utilizes direct current for welding and to connect rectifying means between the welding circuit and the control circuit when the welding circuit utilizes alternating current for welding.

The use of a positive grid bias space discharge device eliminates the necessity of supplying, by means of batteries or an auxiliary rectification circuit, a negative bias to maintain the space discharge devices inactive when welding is not in progress. The positive grid bias type of space discharge device will not supply current to the electrode feeding mechanism until a positive potential equal to or above the critical is applied to the grid of the device. Furthermore, this type of control device generally has a grid-anode characteristic curve which is practically vertical. That is, the grid ignition potential is practically constant for all anode voltages within the voltage range of the device. This characteristic increases sensitivity of the response of the device to changes in the voltage drop across the welding zone and permits simplification of the design of the control circuit. An added advantage of the use of this type of space discharge device is that it permits welding with direct current at voltages very nearly as low as the critical grid voltage of the particular space discharge device used.

Referring more particularly to the drawing, a fusible welding electrode E is illustrated in operative relation to the work W to be welded. Electrically operable feeding means may be provided for advancing the electrode E toward the work W as the electrode is consumed. As shown, this feeding means may comprise a motor M, including the winding of an armature A and a shunt field winding F, for actuating a pair of feeding rollers R, R engaging the welding rod or electrode E. The motor M is preferably a direct current motor and may, if desired, drive the rollers R, R through a suitable speed reducing mechanism, which, for the sake of simplification has been omitted from the drawing.

The welding circuit includes electrode E, work W, and conductors 10 and 12 connected respectively to the electrode E and the work W. The other ends of conductors 10 and 12 may be connected, through a suitable switch, to a source of either direct or alternating electric currrent, both of which, for the sake of simplification, have been omitted from the drawing. A current limiting impedance 14, which may be a resistance if the welding current is direct current or an inductive reactance if the welding current is alternating current, may be included in the conductor 10.

Electrical energy for the electrode feeding mechanism and its associated control system is supplied from a suitable source of alternating current energy, not shown, through conductors 16 and 18 connected to the fixed terminals 20 and 22 of an adjustable potential means such as an autotransformer 24. A conductor 26 connects terminal 20 to one end of the primary winding 28 of a transformer 30, and a conductor 32 connects the other end of primary winding 28 to an adjustable tap 33 on autotransformer 24. A pair of conductors 34 and 36 connect the primary winding 38 of a transformer 40 to conductors 16 and 18, respectively. Transformer 40 is provided with a plurality of secondary windings 42, 44, 46, and 48 for a purpose to be described hereinafter.

A substantially constant unidirectional potential is impressed on the shunt field winding F of the motor M through the medium of a full wave rectifying device 50. The anodes 52, 52 of device 50 are connected by conductors 54 and 56 to opposite terminals of the secondary winding 44 of transformer 40, and the filament or cathode 58 is connected by conductors 60 and 62 to opposite terminals of the secondary winding 46 of the transformer 40. The mid-point 64 of secondary winding 44 and the mid-point 66 of secondary winding 46 are connected by conductors 68 and 70, respectively, to opposite terminals of the field winding F.

The armature A of the motor M is energized with unidirectional current through the medium of a pair of grid-controlled space discharge devices 72 and 74. Each of the devices comprises an anode 76, a control grid 78 and a cathode 80 indirectly heated by a filament 82 which is supplied with current through conductors 84 and 86 connected to opposite terminals of the secondary winding 42 of transformer 40. The discharge devices 72 and 74 are of the "thyratron" tube type, such as the FG—33, which permit the flow of current when the relative positive potential of the grid with respect to the cathode exceeds a certain critical value. When this relative positive potential of the grid is less than the critical value, the devices interrupt the flow of current through the circuit which they control. The grid-anode characteristic of these tubes is approximately vertical so that the grid ignition potential is practically constant for all anode voltages within the voltage range of the tube. This characteristic increases the sensitivity of response and simplifies the circuit design.

The terminals 88 and 90 of secondary winding 91 of transformer 30 are each connected by conductors 92 and 94, respectively, to the anode 76 of one of the space discharge devices 72 and 74. A conductor 96 connects the mid-point 98 of the secondary winding 91 to an input terminal of a reversing switch S, and a conductor 100 connects the other input terminal of the reversing switch S, through conductor 86, to cathodes 80 of the devices 72 and 74. Conductors 102 and 104 connect the output terminals of reversing switch S to opposite sides of the armature A of the motor M. The reversing switch S may be used to adjust the position of the fusing end of the electrode E with respect to the work W preliminary to beginning a welding operation, and may also be used to retract the electrode E from the work W when the welding operation has been completed.

The control circuit includes a pair of conductors 106 and 108 connected at one end to the conductors 10 and 12, respectively, of the welding circuit, and at the other end to the center pair of terminals of a double-pole, double-throw switch 109. Switch 109 constitutes manually operable means for selectively conditioning the control system for operation with either direct current or alternating current applied to the welding circuit. Through the medium of switch 109, a unidirectional potential is impressed on the control circuit irrespective of whether the welding circuit is supplied with direct current or with alternating current. When the welding current is direct current, switch 109 is closed to the left, as viewed in the drawing, to connect conductors 106 and 108 to a pair of terminals 110. When the welding current is alternating current, switch 109 is thrown to the right, connecting conductors 106 and 108 to a pair of terminals 112.

Terminals 110 are connected to the fixed terminals 114 and 116 of voltage adjusting means, such as an adjustable impedance or potentiometer 118. A conductor 120 connects the relatively negative fixed terminal 116 to the conductor 100, which in turn is connected, through conductor 86, to the cathodes 80 of the space discharge devices 72 and 74. A relatively positive adjustable tap 122 on the potentiometer is connected by means such as a conductor 124 directly to a terminal 126, which is in turn connected through voltage limiting resistances 128, 128, respectively to the grid 78 of each space discharge device 72 and 74. By suitable adjustment of the tap 122, a potential proportionate to the voltage drop across the welding zone may be impressed across the grid 78 and cathode 80 of the space discharge devices 72 and 74 when switch 109 engages terminals 110 and the welding circuit is supplied with direct current.

When alternating current is flowing in the welding circuit, conductors 106 and 108 are connected to potentiometer 118 through a rectifying circuit including conductors 130 and 132 connecting the terminals 112 to opposite terminals of primary winding 134 of a transformer 136. Each terminal of secondary winding 138 of the transformer 136 is connected by conductors 140 or 142 to one of the anodes 144, 144 of a full-wave rectifying device 146, and cathode or filament 148 of the device 146 is connected to the ends of the secondary winding 48 of the transformer 40 by conductors 150 and 152. A conductor 154 connects the mid-point 156 of the secondary winding 48 to the terminal 114 of the potentiometer 118, and a conductor 158 connects the mid-point 160 of the secondary winding 138 of transformer 136 to the terminal 116 of the potentiometer. By the described means, when the switch 109 engages terminals 112 and the welding operation is supplied with alternating current, a unidirectional potential, proportional to the welding voltage, is impressed on the potentiometer 118, and thus on the control circuit. To smooth the rectified voltage wave, inductances 162, 162 may be inserted in series in the conductor 158 and capacitances 164, 164 may be connected between conductor 154 and conductor 158. It will be noted that the anodes 144, which are the relatively positive elements of rectifier 146, are connected through conductors 140, 142, winding 138, mid-point 160, conductor 158 and inductances 162, to the relatively negative terminal 116 of potentiometer 118, and the relatively negative element of the rectifier 146, which is the filament or cathode 148, is connected, through conductors 150, 152, winding 48, mid-point 156, and conductor 154, to the relatively positive terminal 114 of the potentiometer. The current flow, however, is from anodes 144 to cathode 148, so that a positive potential is applied to terminal 114 and a negative potential to terminal 116.

Rectified unidirectional current is supplied to the motor armature A as follows: Through the conductors 16 and 18, an alternating potential is impressed on autotransformer 24, and through adjustment of tap 33, a preselected proportion of this potential is impressed on the primary winding 28 of transformer 30. During that portion of the alternating current cycle in which, by virtue of conditions existing in the supply circuit, the terminal 88 of the secondary winding 91 of transformer 30 is positive with respect to the mid-point 98 and with respect to terminal 90, voltage will be applied from terminal 88 through conductor 92 to anode 76 of the device 72. If, at this time, the relative positive potential of the control grid 78 is such that it will permit the device 72 to become active, current will flow from the anode 76 to the cathode 80 and through conductors 86, 100, and 104 to one armature terminal of the motor M. From the opposite armature terminal of the motor M, the current will flow through the conductors 102 and 96 to the mid-point 98 of the secondary winding 91 and through the winding 91 to the terminal 88. At the same time, as the terminal 90 is negative with respect to the terminal 88 and the mid-point 98, no current will flow through the device 74.

During the next half cycle, terminal 90 will be relatively positive with respect to mid-point 98 and terminal 88 of the secondary winding 91 of the transformer 30. During this half-cycle voltage will be applied from terminal 90 through conductor 94 to the anode 76 of the device 74. If the relative positive potential of the control grid 78 of the space discharge device 74 is above the critical value, current will flow through the device from the anode 76 to the cathode 80 and through conductors 86, 100, and 104 to one side of the armature A of the motor M. From the other side of the armature A, the current will flow through conductors 102 and 96 to the mid-point 98 of the secondary winding of the transformer 30 and through this secondary winding back to the terminal 90. It will thus be observed that full-wave rectified current is supplied to the motor armature A. At the same time, the field winding F is supplied with current from the full-wave rectifying device 50, the operation of which will be readily understood upon inspection.

The operation of the welding system will now be described in detail. Before beginning the welding operation, motor M is energized to advance electrode E into operative relation with the work W, and with the fusing end of the electrode positioned at the preselected distance from the work. Tap 33 of autotransformer 24 is then so adjusted that, when the motor is energized, it will operate rapidly enough to advance the electrode toward the work at a rate slightly in excess of the rate of consumption of the electrode.

If the current flowing in the welding circuit is direct current, switch 109 is closed to the left, whereby the welding potential is impressed directly on potentiometer 118 through conductors 106 and 108, switch 109 and terminals 110. If alternating current is flowing in the welding circuit, switch 109 is closed to the right. The welding potential is then impressed on potentiometer 118 through conductors 106 and 108, terminals 112, conductors 130 and 132, transformer 136, rectifier 146 and conductors 154 and 158. In either event, the connections are so arranged that the fixed terminal 114 of the potentiometer is relatively positive and the fixed terminal 116 relatively negative.

The adjustable tap 122 of the potentiometer 118 is then adjusted so that, when the spacing between the electrode E and the work W exceeds by a slight amount the desired spacing, a sufficient portion of the welding voltage will be impressed between the tap 122 and the terminal 116 that the relative positive potential of the grid 78 of each space discharge device 72 and 74 with respect to the cathode 80 thereof will exceed the critical value. Under such conditions, the devices 72 and 74 will permit current to flow in the motor armature winding circuit, and the motor will then move the electrode E toward the work W until such time as the predetermined spacing between the electrode and the work has been re-established. When this occurs, the welding voltage will have dropped to a value such that the potential existing between tap 122 and terminal 116 will be less than the critical relative positive potential of the grids 78 with respect to the cathodes 80, thereby interrupting the flow of current through the motor circuit.

From the foregoing, it will be apparent that an improved and simplified electric welding system has been provided in which the sensitivity of control has been increased by eliminating a balancing circuit for the space discharge devices. These devices are of an improved type which pass current when the relative positive potential of the grid with respect to the cathode exceeds the critical value. Thereby, the grids may be connected directly to the positive side of the welding circuit, and, as the grid-anode characteristic of the space discharge devices is substantially vertical, the operation of the devices will be substantially constant throughout a wide range of anode voltages. The control system is effective to regulate the spacing of the welding electrode from the work irrespective of whether direct current or alternating current is used for welding.

While a specific embodiment of the invention has been illustrated, it is to be understood that this embodiment is exemplary only, and that the invention may be otherwise embodied.

What is claimed is:

1. An electric welding system comprising, in combination, a welding circuit including a fusible electrode and the work; electrically operable feeding means for advancing said electrode toward the work; a control circuit including an impedance connected in parallel with said welding circuit; a pair of grid-controlled space discharge devices connected in series with said feeding means; means connecting the grids of said devices directly to a point of relatively positive potential on said impedance; and means connecting the cathodes of said devices to a point of relatively negative potential on said impedance.

2. An electric welding system comprising, in combination, a welding circuit including a fusible electrode and the work; an electric motor including an armature winding and a shunt field winding for advancing said electrode toward the work; means for impressing a substantially constant unidirectional potential on said field winding; a control circuit including an impedance connected in parallel with said welding circuit; a pair of grid-controlled space discharge devices connected in series with said armature winding; means connecting the grids of said devices directly to a point of relatively positive potential on said impedance; and means connecting the cathodes of said devices to a point of relatively negative potential on said impedance.

3. An electric welding system comprising, in combination, a welding circuit including a fusible electrode and the work to be welded, said circuit being adapted to utilize either direct current or alternating current for welding; means, including an electric motor, for feeding said electrode toward said work; means controlling the energization of said motor in accordance with an electrical condition of said welding circuit; rectifying means electrically connected to such controlling means; and means selectively operable to connect either such controlling means to said welding circuit when said welding circuit is utilizing direct current or to connect said rectifying means to said welding circuit when said welding circuit is using alternating current.

4. An electric welding system comprising, in combination, a welding circuit including a fusible electrode and the work; electrically operable feeding means for advancing said electrode toward the work; a control device operatively associated with said feeding means; a control circuit adapted to connect said device to said welding circuit; rectifying means electrically connected to said control circuit; and means selectively operable to connect said control circuit directly to said welding circuit when said welding circuit utilizes direct current for welding and to connect said rectifying means to said welding circuit when said welding circuit utilizes alternating current for welding, for impressing on said device a unidirectional potential, proportional to the welding voltage, irrespective of whether said welding circuit is supplied with alternating current or direct current.

5. An electric welding system comprising, in combination, a welding circuit including a fusible electrode and the work; electrically operable feeding means for advancing said electrode toward the work; positive grid-controlled space discharge means operatively associated with said feeding means, a potentiometer provided with an adjustable tap; means directly connecting said tap to the grids of said space discharge means; rectifying means connecting in parallel with said potentiometer; and means for selectively connecting either said potentiometer or said rectifying means in parallel with said welding circuit.

6. An electric welding system comprising, in combination, a welding circuit including a fusible electrode and the work; electrically operable feeding means for advancing said electrode toward the work; a pair of positive grid-controlled space discharge devices operatively associated with said feeding means; a potentiometer having an adjustable tap; selectively operable means for connecting said potentiometer in parallel with said welding circuit; means connecting the relatively negative terminal of said potentiometer to the cathodes of said space discharge devices; and means for directly connecting the grids of said devices only to said adjustable tap.

7. An electric welding system as claimed in claim 6, including rectifying means connected in parallel with said potentiometer; said selectively operable means being operable to connect selectively either said potentiometer or said rectifying means in parallel with said welding circuit.

8. An electric welding system comprising, in combination, a welding circuit including a fusible electrode and the work; electrically operable feeding means for advancing said electrode toward the work; a control circuit including control means for causing and interrupting a flow of current to said feeding means to start and stop the latter; rectifying means electrically connected to said control circuits; and means selectively operable to connect said control circuit directly to said welding circuit when said welding circuit utilizes direct current for welding and through said rectifying means to said welding circuit when said welding circuit utilizes alternating current for welding, for impressing on said control circuit a unidirectional potential proportional to the welding voltage when either direct current or alternating current is used for said welding circuit.

9. An electric welding system comprising, in combination, a welding circuit including a fusible electrode and the work; an electric motor for advancing said electrode toward the work; a pair of positive-bias grid-controlled space discharge devices; a potentiometer having an adjustable tap; means connecting the grids of said devices only to said adjustable tap; selectively operable means for impressing on said potentiometer a unidirectional potential when either direct current or alternating current is flowing in said welding circuit; a transformer; adjustable means for impressing a pre-selected alternating potential on the primary winding of said transformer; means connecting the terminals of the secondary winding of said transformer to the anodes of said devices; means connecting the mid-point of said secondary winding to one side of the armature winding of said motor; means connecting the opposite side of said armature winding to the cathodes of said devices; and means for connecting said cathodes to a terminal of said potentiometer which is relatively negative with respect to said adjustable tap.

10. An electric welding system as claimed in claim 9, wherein said motor has a field winding, and including means for impressing a unidirectional substantially constant potential on said field winding of the motor.

11. An electric welding system as claimed in claim 2, in which said selectively operable means includes rectifying means connected to said potentiometer and a switch for selectively connecting either said potentiometer or said rectifying means in parallel with said welding circuit.

12. An automatic welding system comprising, in combination, a welding circuit including a fusible electrode and the work; means, including a direct current electric motor, for feeding said electrode toward said work; and an electrode feed control circuit for said motor, comprising positive-bias space-discharge vacuum tube means having a critical positive grid ignition potential and a grid-anode characteristic that is substantially vertical whereby the grid ignition potential is substantially constant over a relatively wide anode voltage range; and adjustable circuit means for rendering said grid ignition potential directly responsive to the voltage drop across said electrode and said work; the control circuit arrangement being such that said electrode is automatically fed toward said work when such voltage drop exceeds a predetermined critical value.

EDWIN A. CLAPP.

CERTIFICATE OF CORRECTION.

Patent No. 2,260,510.  October 28, 1941.

EDWIN A. CLAPP.

It is hereby certified that error appears in the printed specification of the above numbered patent requiring correction as follows: Page 5, first column, line 48, for the word "circuits" read --circuit--; and second column, line 31, claim 11, for the claim reference numeral "2" read --9--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.